United States Patent
Buckley

(10) Patent No.: US 8,204,528 B2
(45) Date of Patent: Jun. 19, 2012

(54) APPARATUS, AND ASSOCIATED METHOD, FOR FACILITATING ACCESS TO A HOME, OR OTHER PUBLIC NETWORK

(75) Inventor: Adrian Buckley, Tracy, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 834 days.

(21) Appl. No.: 12/109,200

(22) Filed: Apr. 24, 2008

(65) Prior Publication Data

US 2009/0270117 A1    Oct. 29, 2009

(51) Int. Cl.
*H04W 4/00* (2009.01)
(52) U.S. Cl. .............. 455/515; 455/436; 455/426.1; 455/443; 455/525; 455/552.1; 370/329; 370/338; 370/341
(58) Field of Classification Search .......... 455/515, 455/443, 525, 552.1, 436, 426.1; 370/338, 370/329, 341
See application file for complete search history.

(56) References Cited

U.S. PATENT DOCUMENTS

2006/0029027 A1 * 2/2006 Buckley ............... 370/338
2008/0004009 A1   1/2008 Caldwell

FOREIGN PATENT DOCUMENTS

| EP | 1708526 | 4/2006 |
|---|---|---|
| GB | 2426663 A | 11/2006 |
| WO | 2005043824 | 5/2005 |

OTHER PUBLICATIONS

European Patent Office, European Search Report mailed. Sep. 23, 2008 for EP application No. 08158901.2, 4 pages.
European Patent Office, Extended European Search Report mailed, Jan. 13, 2009, for EP application No. 08158901.2, 8 pages.
European Patent Office, Intent to Grant mailed, Jul. 21, 2011, for EP application No. 08158901.2 30 pages.

* cited by examiner

*Primary Examiner* — Pierre-Louis Desir
(74) *Attorney, Agent, or Firm* — Research In Motion Limited

(57) ABSTRACT

An apparatus, and an associated method, for facilitating home, or other public network access by a wireless device. The access is made in order to access public-network services by the wireless device when connecting to the public network by way of another network. Access availability by way of 802.1x-capable wireless local area networks, if any, is determined. A listing is made of networks through which connections are able to be made. And, if operator policy permits, a public-network access attempter attempts to make communication connections by way of non-802.1x-capable wireless local area networks, if any. Identification is made of network access availability, and such identified network access is displayed to provide a user of the wireless device with an opportunity to select in what manner to connect to the public network.

13 Claims, 3 Drawing Sheets

84

| 86 | 88 | 92 |
|---|---|---|
| PLMN | WLAN NAME | METHOD OF ACCESS |
| ORANGE VODAFONE TMO | STARLIGHT | 802.1x |
| HPLMN | COFFEESHOP | SPLASH SCREEN |
| HPLMN | LOUNGEACCESS | OPEN ACCESS |

APPARATUS, AND ASSOCIATED METHOD, FOR FACILITATING ACCESS TO A HOME, OR OTHER PUBLIC NETWORK

The present disclosure relates generally to a manner by which to facilitate access of a wireless device to a network, such as its HPLMN (Home Public Land Mobile Network). More particularly, the present disclosure relates to an apparatus, and an associated method, in which the wireless device accesses the network by way of a first authentication-type connection, if available, or by way of a second authentication-type connection, if available.

BACKGROUND OF THE DISCLOSURE

Various cellular, and cellular-like systems have been developed and deployed that provide mobile, and other wireless, communication services. Wireless local area networks (WLANs) are exemplary of such cellular-like communication systems. A WLAN is typically an IP (Internet Protocol)-capable network implemented, e.g., pursuant to Wi-max, 802.11a, b, g, n, GERAN (Generic Radio Access Network), UTRAN (Universal Terrestrial Radio Access Network), LTE (Long Term Evolution), or any of various other network-technology schemes. WLAN systems are generally deployed over relatively smaller areas than the areas over which a cellular, i.e., a PLMN (Public Land Mobile Network) is typically deployed but other WLAN technologies such as but not limited to Wi-max are now providing coverage comparable to that of a PLMN. A WLAN is deployed, for instance, to encompass a business, or other, enterprise. Sometimes, a WLAN is operated by an operator that also operates a PLMN.

Interworking between WLAN systems and PLMN systems provide for seamless communication operations using a mobile station operable in both of the network systems. As communication by way of a WLAN system is generally less expensive than communications by way of a PLMN system, if communications by way of the WLAN system are available, communications by way of the WLAN system are generally preferred.

A mobile station that operates in a PLMN system, is associated with a home network, i.e., an HPLMN (Home Public Planned Mobile Network). Subscription is typically made for specific services, herein referred to as HPLMN services, permitted of the mobile station pursuant to its service subscription. When the mobile station is positioned to be in direct communication connectivity at the HPLMN, such services are made available to the mobile station upon its authentication at the HPLMN. When, however, the mobile station roams beyond the coverage area of the HPLMN, or otherwise does not communicate directly with the HPLMN, the mobile station accesses the HPLMN by way of another network, such as a WLAN. An authentication mechanism, carried out by way of the other network, for access by the mobile station to the HPLMN services is sometimes required.

Recent attention has been directed towards such a mechanism. For instance, a series of documents of the technical specification, TS 24.234 define two mechanisms by which to permit a wireless device, a UE (User Equipment), to access HPLMN services. One mechanism pertains to the use of IEEE 802.1x authentication. And, a second mechanism is by way of a non-802.1x authentication-capable WLAN. In the second mechanism, the wireless device tunnels directly to a HPLMN network node e.g. a PDG (Packet Data Gateway) etc. The availability of networks by way of which the wireless device is able to attempt access to the HPLMN services depends upon the location at which the wireless device is positioned.

While the aforementioned technical standard defines two mechanisms by which the wireless device can access an HPLMN system, the existing technical specification, to date, has not defined various aspects of the mechanisms. For instance, the technical specification fails fully to define working of the mechanisms when combined together.

DETAILED DESCRIPTION

Figure 1:
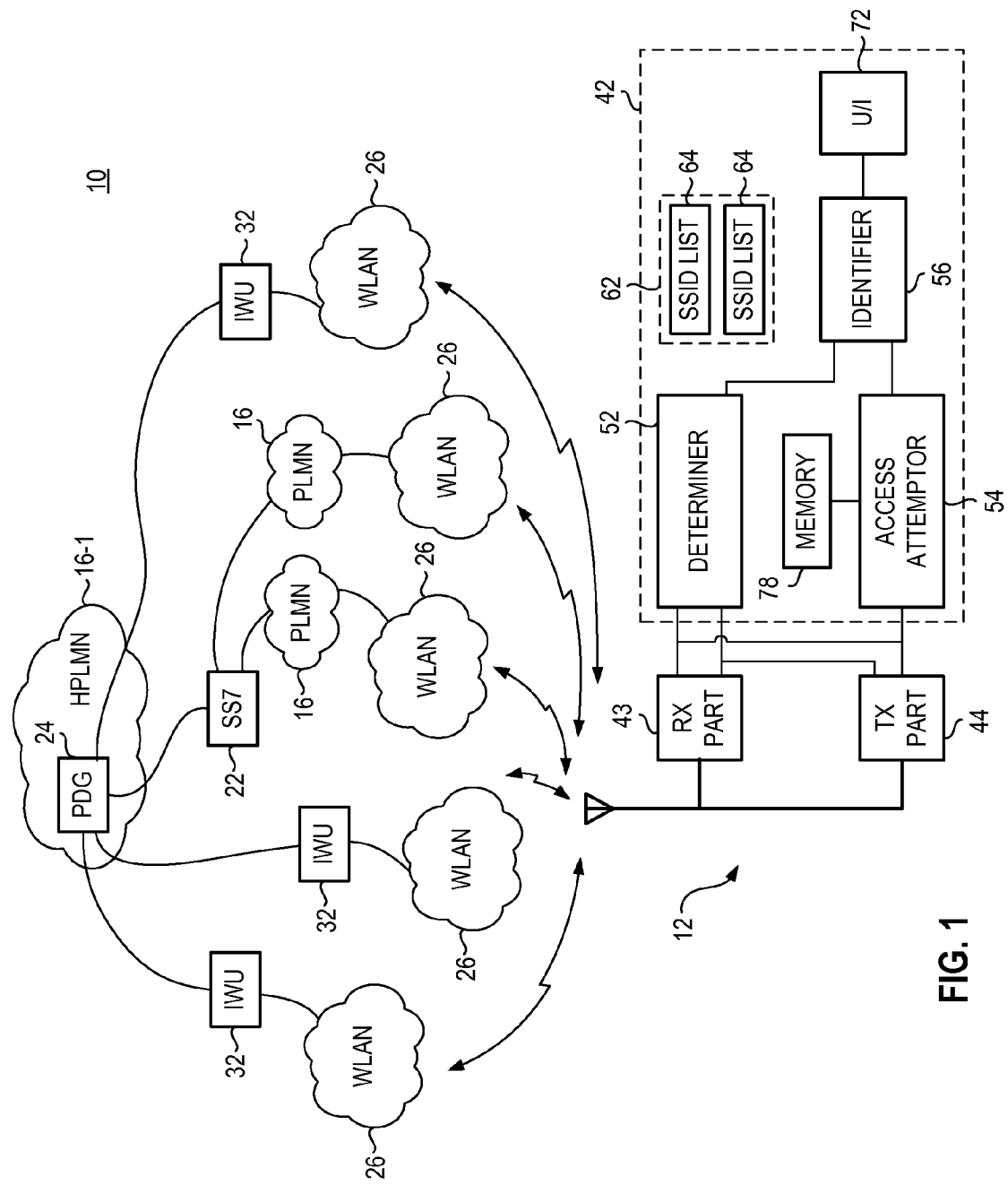
FIG. 1 illustrates a functional block diagram of an exemplary communication system in which an embodiment of the present disclosure is operable.

The present disclosure, accordingly, advantageously provides an apparatus, and an associated method by which to facilitate access of a wireless device to its home network, such as a home public land mobile network (HPLMN).

Through operation of an embodiment of the present disclosure, a manner is provided by which to facilitate the wireless-device access to home-network services by way of a first authentication-type connection, if available, or, selectably by way of a second authentication-type connection, if available.

In one aspect of the present disclosure, a wireless device monitors for network broadcasts network-identifying, and other, information. Through the detection of the broadcasts, the wireless device is made aware of the potential availability of the associated networks through which to communicate. The networks are identified, for instance, by SSID (Service Set Identifier) values.

In another aspect of the present disclosure, SSID lists are maintained at the wireless device that identify the SSID values associated with the networks that are preferred to be used by the wireless device, such as when the wireless device roams beyond the HPLMN. In one implementation, multiple SSID lists are maintained, with entries of SSID values on the different ones of the lists associated with different levels of preference of usage. And, in one implementation, a prohibited-SSID list is further maintained, listing SSID values associated with networks with which the wireless device is prohibited from communicating. And, in one implementation, the SSID lists correspond to the lists set forth in the aforementioned technical specification of TS 24.234.

In another aspect of the present disclosure, the SSID values detected during network scans by the wireless device are compared with values stored at one or more of the SSID lists. The results of the comparison identify networks, by their SSID values, that are both detected by the wireless device and listed on an SSID list of allowed networks of the wireless device.

In another aspect of the present disclosure, networks identified as a result of the comparison are further identified to be 802.1x-capable or non-802.1x-capable. Association and authentication mechanisms for 802.1x-capable networks are defined, e.g., in technical specification, TS 24.234. And, for each of the 802.1x-capable networks, identified by an associated SSID value, an availability of access to the HPLMN by way of the 802.1x-capable networks is determined. That is to say, if more than one network is identified to be potentially available and on an SSID list, the association and authentication mechanisms are repeated by way of the additional network. That is to say, for each network identified as a result of the comparison, determination is made of the access availability with the network node e.g. packet data gateway, or other entity, of the home network of the wireless device. If accessible, the wireless device makes note of the successful access. A list is thereby created of each 802.1x-capable network through which access is able to be made to access the home network of the wireless device.

In another aspect of the present disclosure, the comparison of the available networks with the SSIDs stored at a list also identifies, if any of the identified networks is a non-802.1x-capable network. For each such non-802.1x-capable network, selectably, attempt is made to set up a tunnel to the network node e.g. packet data gateway etc of the HPLMN associated with the wireless device. If the tunneling is successful, and the wireless device is able to perform connection with the home network by way of the SSID-identified network, the wireless device makes note of the success of the connection attempt, and the tunnel is torn down. If more than one non-802.1x-capable network is identified, the mechanism is repeated for each of the additional, identified networks. If a connection is successfully formed, the wireless device makes note of the successful connection and tears down the tunnel.

A listing is thereby provided of each of the 802.1x-capable and non-802.1x networks that provide for connection to the home network of the wireless device and, thereby, access to the HPLMN services.

In another aspect of the present disclosure, an operator policy is provided and stored at the wireless device. The policy is stored at a memory element that is either internal to the wireless device or forms a removable memory removeably connectable to the wireless device. The operator policy identifies whether the wireless device should attempt to connect to the home-network by way of a non-802.1x-capable network. Other implementations of the policy could be to try 802.1x networks first or non 802.1x first depending upon the operator policy, selection is made to attempt the connection by way of the non-802.1x-capable networks.

In these and other aspects, therefore, an apparatus, and an associated method, is provided for facilitating network access by a wireless device. Availability of access to the network by way of first-authentication-type connections, if available is determined. And, network access is selectably attempted by way of second-authentication type connections, if available. Network access availability is identified responsive to the home-network access attempts.

Turning first, therefore, to FIG. 1, an arrangement, shown generally at 10, forms a wireless communication system having mobile stations, such as the mobile station 12 operable to communicate with a network part of the communication system. While only a single mobile station 12 is shown in the figure, in a typical arrangement, large numbers of mobile stations are concurrently operable to communicate pursuant to performance of a communication service. Mobile stations are wireless devices and are sometimes referred to as being UEs, User Equipment. The terms wireless device, mobile station, and UE are used interchangeably herein.

The exemplary network portion of the communication system includes both public land mobile network (PLMNs) 16 and wireless local area networks (WLANs). Here, one of the public land mobile networks forms a home network, here an HPLMN (Home Pubic Land Mobile Network) 16-1. Other mobile stations analogously are associated with home networks, not necessarily the HPLMN 16. That is to say, a mobile station is associated with a particular PLMN 16 as its home network. It should be noted that the arrangement shown in FIG. 1 is merely exemplary. And, while the networks 16 are shown to be PLMNs, viz., variously VPLMNs (Visited Public Land Mobile Networks) and an HPLMN (Home Public Land Mobile Network), these networks, in other arrangements, are implemented as other network types with appropriate network reconfiguration, as needed.

The mobile station 12 is here a multi-mode mobile station that permits its communication not only in conformity with the communication protocols to permit its communication with the HPLMN 16-1 and also others of the PLMNs 16. The networks 16 are here shown to be interconnected by an SS7, or other appropriate, entity 22. And, the HPLMN 16-1 also includes a network node, here for illustrative purposes called a packet data gateway (PDG) 24 but could be another network node that provides access to the home network. The packet data gateway or other node is identified by an IP address that is known to the mobile station. The networks 16 also include packet data gateways (not separately shown). When the mobile station is positioned within the coverage area of the HPLMN, the mobile station is capable of communicating therewith pursuant to a service subscription or other authorization. And, if roaming, or other, agreements are in place with the operators of the PLMNs 16, the mobile station is able also, using the same communication protocols, to communicate with its HPLMN 16-1 by way of a PLMN 16. The packet data gateway, or other node, includes, e.g., the functionality of a detector, an authenticator, and an access grantor.

The multi-mode capability of the mobile station here also permits its communication with a WLAN 26. Here, multiple WLANs are shown with overlapping coverage areas that include the location at which the mobile station is positioned. The communication protocols used by the WLANs are of any of various schemes including, for instance, Wi-max, 802.11a, b, g, n GERAN, UTRAN, LTE or any of various other IP, or other, network-types. In the arrangement shown in FIG. 1, the mobile station 12 is positioned within coverage areas encompassed by each of the WLANs 26. And, the mobile station potentially is able to communicate with, and by way of, any of the WLANs 26. While the mobile station is potentially able to communicate with one or more of the WLANs 26, home-network services are accessible by way of the home network of the mobile station. While communications are carried out by way of a WLAN, in order to access the HPLMN services, access must be made to the HPLMN. In the arrangement shown in FIG. 1, the mobile station is beyond the coverage area of the HPLMN. And, in other scenarios, even if within the coverage area of the HPLMN, there sometimes are reasons for which to prefer that the communications with the mobile station be carried out by way of a WLAN.

The WLANs are variously shown to be placeable in communication connectivity with the HPLMN by way of interworking units (IWUs) 32 or by way of PLMNs 16. The interworking units provide for interworking between WLANs and PLMNs. Signaling and user data is converted by the IWUs to permit its use when communicated between the different types of networks when communicated between the networks.

As noted previously, the technical specification, TS 24.234 series of documents define two mechanisms by which to permit a wireless device to access HPLMN services. A first utilizes an IEEE 802.1x authentication mechanism. And, a second uses a non-802.1x authentication-capable WLAN. As also noted previously, the technical specification fails to specify how the two mechanisms work when combined together.

Accordingly, pursuant to an embodiment of the present disclosure, the mobile station includes apparatus 42 that facilitates home-network access by a mobile station. The apparatus is functionally represented, implementable, e.g., in any desired manner including, in part, algorithms executable by processing circuitry. The apparatus is here shown to be connected to transceiver circuitry here formed of a receive part 43 and a transmit part 44. While illustrated to be separate from the transceiver circuitry, in one implementation, parts of the apparatus 42 are embodied together with the transceiver circuitry parts. The apparatus includes a first home-network access availability determiner 52, a second home-network access attempter 54, and an identifier 56. and, as noted previously, while the networks 16, in the exemplary arrangement, comprise PLMNs, and the apparatus, in the exemplary arrangement, is described to facilitate access to the HPLMN 16-1, more generally, the apparatus facilitates access to any selected public, or other, network.

A memory element 62 is also illustrated. The memory element is of any of various constructions, formed, for instance, of a pc card such as a PCMCIA a compact flash I, (CF-I), a compact flash II, (CF-II), a smart media card (SM/SMC), a memory stick, a memory stick duo (MSD), a memory stick pro duo (MSPD), a memory stick pro-HG duo (MSPDX), a memory stick micro m2 (M2), a multi media card (MMC), a mutli media card (RS-MMC), an MMC micro card (MMC micro), a secure digital card (SD), an SxS (SxS), a universal flash storage (UFS), a mini SD card (mini SD), a micro SD card (micro SD), an XD-picture card (xD), an intelligence stick (I Stick), a serial flash module (SFM), a micro card (micro card), or an NT card (NT NT+) USIM, ISIM, R-URIM, UICC etc. The memory element also, e.g., comprises a fixed storage location of the wireless device.

In one implementation, listings 64 of SSIDs (Service Set Identifiers) are maintained at the memory element 62. The lists are, e.g., in conformity with the technical specification TS24.234. Or, alternately, the SSID lists are configured in other manners, such as by containing, on separate lists, SSID values of networks of differing preference levels including, e.g., most-preferred and least-preferred networks.

And, an interface (UI) 72 is further shown. The interface 72 includes an input and a display to permit input of information and display of information, respectively. The input comprises, for instance, a telephonic keypad and a QWERTY keyboard. And the display, e.g., comprises a liquid crystal display capable at least of displaying alpha numeric information.

In operation, the wireless device performs scanning for broadcasts of information by different ones of the WLANs to determine whether the wireless device is within coverage area of the broadcasting WLAN. Detected SSID values in the broadcast information are compared with stored SSID values, stored at the memory element 62. The broadcasts indicate 802.1x-capability of the detected WLAN. Or, the wireless device is otherwise made aware of the capability of the WLAN, such as by pre-stored information at the wireless device. And, the wireless device compares detected information with stored information, stored at the memory element 62. The comparison indicates which networks have signals detected by the wireless device and also are permitted to be used by the wireless device with which, and through which, to communicate.

The access availability determiner 52 operates to determine availability a communication of access to the HPLMN 16 by way of an 802.1x-compatible WLAN 26, if any have been identified. When multiple WLANs have been identified as being 802.1x-compatible, the determiner iterates the procedure for each of the identified WLANs. The access availability determination by way of each of the 802.1x-capable WLAN is carried out in conformity with the mechanisms set forth in the aforementioned technical specification TS 24.234. Results of the attempt are learned, and indications are provided to the identifier 56 that, in turn, cause the results to be displayed at the display of the user interface.

The access attempter 54 operates to attempt to form connections with the HPLMN 16 if operator policy is permitting of such connection attempts. The operator policy is provided to the wireless device, here indicated to be stored at a memory location 78, accessible by the attempter 54. While functionally represented separate from the memory element 62, the memory location, in an exemplary implementation, is physically located at the memory element 62

In exemplary operation, the access attempter 54 attempts, for each non-802.1x-compatible WLAN, if any, and when authorized by operator policy, to attempt to set up a tunnel to the network node, e.g., packet data gateway 24 of the HPLMN by way of the identified WLAN. The tunnel is by way of the WLAN and IWU 32, if such is the connection with the packet data gateway 24. Or, the tunnel is formed by way of a PLMN 16 if such is the communication to the HPLMN. The IP address of the end point, e.g., the PDG 24 is also known to the wireless device. Knowledge of the IP address is obtained, for instance, responsive to a DNS (Domain Name System) lookup. If a successful connection is formed, the wireless device then tears down the tunnel and iteratively performs the same procedure for each, if any, additional non-802.1x WLAN. Results of the connection attempts are learned and provided to the identifier 56. The identifier causes display on the user interface indications of the successful communication-path connections.

In the event that the non-802.1x-capable WLANs include some form of required authentication, and the wireless device is unable to reach the destination IP address or resolve a FQDN (Fully Qualified Domain Name), in one implementation, the wireless device is further operable to open up a browser and attempt to obtain information to permit a successful connection attempt.

Figures 2, 4:
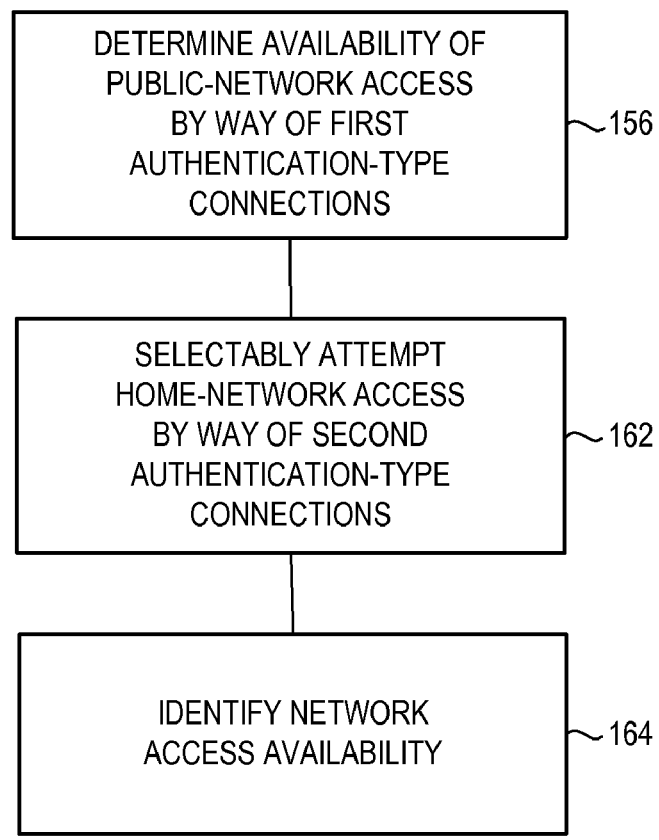
FIG. 2 illustrates an exemplary screen display generated pursuant to operation of an embodiment of the present disclosure.
FIG. 4 illustrates a method flow diagram representative of the method of operation of an embodiment of the present disclosure.

FIG. 2 illustrates an exemplary screen display 84 displayable upon the user display of the interface 72 (shown in FIG. 1). In the exemplary implementation, the identifier 56 (shown in FIG. 1) causes display of the display 84 completion of connection attempts. That is to say, when both 802.1x-capable and non-802.1x capable networks are detected and operator policy permits operation of the second attempter 54, the display displays information upon completion of both of the attempters 52 and 54. If WLANs of particular connection and authentication-types are not available, then the display, correspondingly, does not include indication of any of such connections. Here, the exemplary display 84 shows three columns, a first column 86, a second column 88, and a third column 92. The first column indicates a PLMN identity, the second column 88 shows a WLAN identity, and the third column 92 shows a method of access for each of the available connections.

Figure 3:
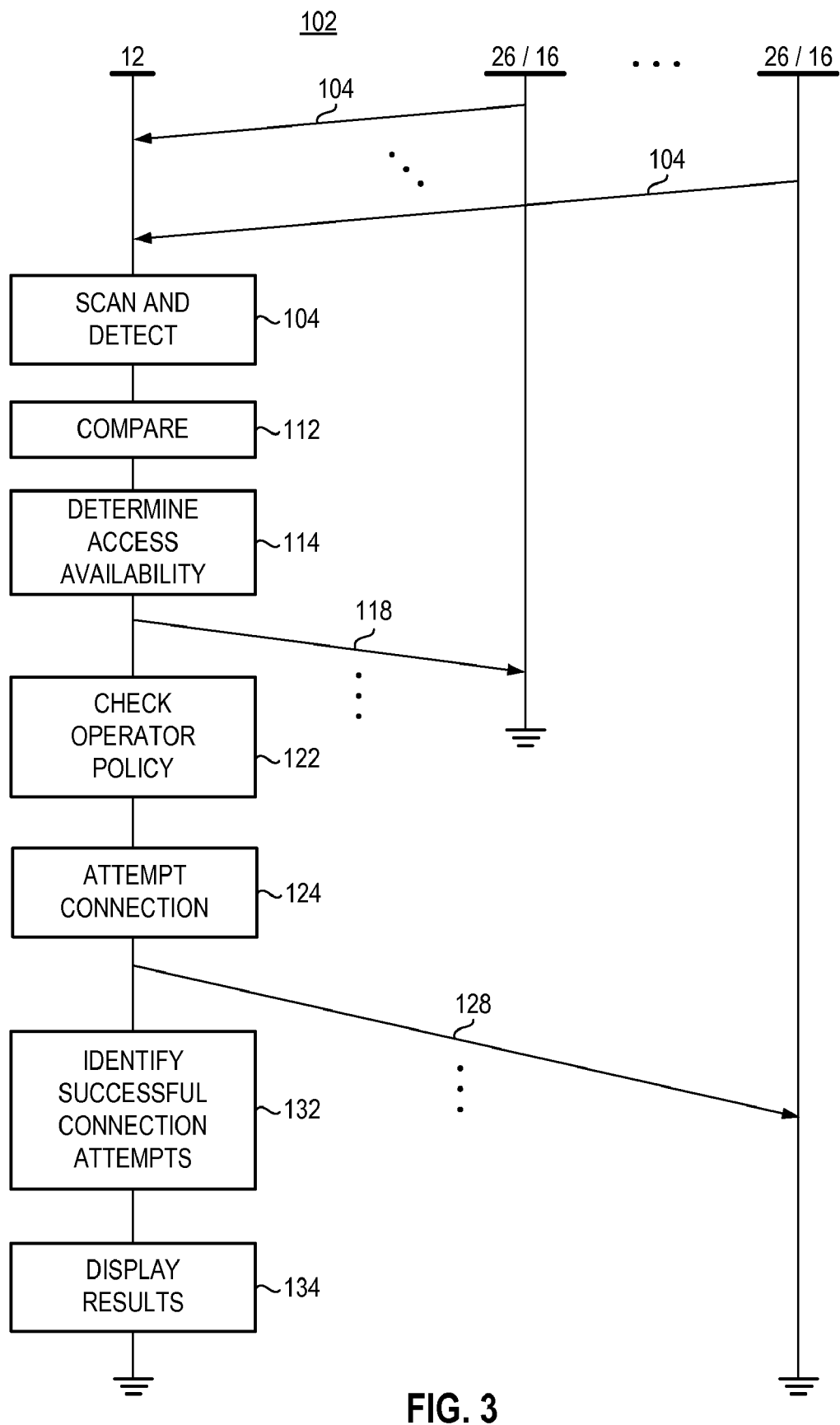
FIG. 3 illustrates a sequence diagram representative of the sequence of operation of an embodiment of the present disclosure.

FIG. 3 illustrates and exemplary process, shown at 102, pursuant to which an embodiment of the present disclosure operates. The process is exemplary only. In other implementations, process steps are preformed in any of various orders.

In the exemplary process, the wireless device 12 scans channels to detect broadcasts 104 of information by different ones of the WLANs 26. Pursuant to the scanning, detection is made, indicated by the block 104, of potentially available WLANs and their authentication types, at least in terms of 802.1x-capability. Comparison is made, indicated by the block 112, of detected SSID values with stored SSID values, stored at the wireless device.

Then, and as indicated by the block 114, an availability of access to the home network is determined by way of each, if any, of the 802.1x-capable WLANs that are available and listed at the memory element. Mechanisms corresponding to those set forth in the technical specification TS 24.234, are used, indicated by the segments 118.

Then, as indicated by the block 122, the wireless device checks on operator policy to determine whether the wireless device is permitted to make connection attempts by way of non-802.1x-capable networks. If so, attempts, indicated by the block 124, are made and tunneling connections, here indicated by the segments 128 are carried out.

Identification is made, indicated by the block 132, of the successful connection attempts. And, a display, indicated by the block 134 is made of the identified successful connections. A user of the wireless device, by viewing the display, is provided with the opportunity to make selection of use of a particular WLAN pursuant to communication operations to perform a communication service. Following are psuedo-code implementations of various embodiments for carrying out processes, such as processes included in the process 102.

Embodiment 1

```
Scan band
SSID on User Controlled WLAN Specific Identifier list
   Associate
   802.1x perform TS24.234 procedures
   Optional non 802.1x procedures supported
      Yes
         Non 802.1x attempt to connect to HPLMN directly
            Optionally display splash screen
            Try X times
               Success store
               Fail
      No
   Checked all SSIDs on User controlled list
      No return to Associate above
      Yes next line
SSID Operator Controlled WLAN Specific Identifier list
   Associate
   802.1x perform TS24.234 procedures
   Optional non 802.1x procedures supported
      Yes
         Non 802.1x attempt to connect to HPLMN directly
            Optionally display splash screen
            Try X times
               Success store
               Fail
      No
   Checked all SSIDs on Operator controlled list
      No return to Associate above
      Yes next line
Check other SSIDs
   Associate
   802.1x perform TS24.234 procedures
   Optional non 802.1x procedures supported
      Yes
         Non 802.1x attempt to connect to HPLMN directly
            Optionally display splash screen
            Try X times
               Success store
               Fail
      No
   Any SSIDs left
```

```
      No return to Associate above
      Yes next line
Display PLMNs
```

Embodiment 2

```
SSID on nth Controlled WLAN Specific Identifier list
   Associate
   802.1x perform TS24.234 procedures
   Optional non 802.1x procedures supported
      Yes
         Non 802.1x attempt to connect to HPLMN directly
            Optionally display splash screen
            Try X times
               Success store
               Fail
      No
   Checked all SSIDs on nth controlled list
      No return to Associate above
      Yes next line
More SSIDs left
   Yes
   More lists left
      Yes
         Increase to nth+1 list
         Repeat procedure above
      No
         Perform nth procedure last time
   No
Display PLMN
```

Embodiment 3

```
Scan band
SSID on User Controlled WLAN Specific Identifier list
   Associate
   802.1x perform TS24.234 procedures
      HPLMN connect
         Yes - stop procedure
         No - store PLMN list
   Optional non 802.1x procedures supported
      Yes
         Non 802.1x attempt to connect to HPLMN directly
            Optionally display splash screen
            Try X times
               Success stop procedure
               Fail store PLMN list
      No
   Checked all SSIDs on User controlled list
      No return to Associate above
      Yes next line
SSID Operator Controlled WLAN Specific Identifier list
   Associate
   802.1x perform TS24.234 procedures
      HPLMN connect
         Yes - stop procedure
         No - store PLMN list
   Optional non 802.1x procedures supported
      Yes
         Non 802.1x attempt to connect to HPLMN directly
            Optionally display splash screen
            Try X times
               Success stop procedure
               Fail store PLMN list
      No
   Checked all SSIDs on Operator controlled list
      No return to Associate above
      Yes next line
Check other SSIDs
   Associate
   802.1x perform TS24.234 procedures
      HPLMN connect
         Yes - stop procedure
```

```
        No - store PLMN list
    Optional non 802.1x procedures supported
        Yes
            Non 802.1x attempt to connect to HPLMN directly
                Optionally display splash screen
                Try X times
                    Success stop procedure
                    Fail store PLMN list
        No
    Any SSIDs left
        No return to Associate above
        Yes next line
    Choose PLMN per TS 24.234
```

Embodiment 4

```
Network ID on nth Controlled Network ID Specific Identifier list
    Associate
        Perform Access method 1
            Home Network Available
                Yes - stop procedure
                No - store Network IDs received
            Optional 2nd access method supported
                Yes
                    2nd access method attempt to connect to Home network directly
                        Optionally display splash screen
                        Try X times
                            Success stop procedure
                            Fail store Network IDs list
                No
        Checked all Network IDs on nth controlled Network IDlist
            No return to Associate above
            Yes next line
    More Network IDs left
        Yes
        More lists left
            Yes
                Increase to nth+1 list
                Repeat procedure above
            No
                Perform nth procedure last time
            No
    Display Network IDs / names
```

Embodiment 5
The non-802.1x Network Selection leaf indicates whether a WLAN UE when performing a network selection shall also attempt to access non 802.1x WLANs.
   Occurrence: One
   1) Format: bool
   Access Types: Get, Replace
   Values: 0, 1
      0—Indicates that the network operator prefers the Network Selection to try non 802.1x WLANs.
      1—Indicates that the network operator prefers the Network Selection to not try non 802.1x WLANs
Note the bit vales could be swapped around above.

```
    <Node>
        <NodeName> Non 802.1x Network Selection </NodeName>
        <DFProperties>
            <AccessType>
                <Get/>
                <Replace/>
            </AccessType>
            <DFFormat>
                <bool/>
            </DFFormat>
            <Occurrence>
                <One/>
            </Occurrence>
            <DFTitle> Non 802.1x Network Selection </DFTitle>
            <DFType>
                <MIME>text/plain</MIME>
            </DFType>
        </DFProperties>
    </Node>
```

FIG. 4 illustrates a method flow diagram, shown generally at 154, representative of the method of operation of an embodiment of the present disclosure. The method facilitates home-network access by a wireless device.

First, and as indicated by the block 156, availability of public network access is determined by way of first-authentication type connections, if available. Then, and as indicated by the block 162, public-network access is selectably attempted by way of second-authentication type connections, if available. Then, and as indicated by the block 164, network access availability is identified in response to the public-network access attempts. The public network access comprises, for instance, home network access of a home network of a mobile station, such as the HPLMN of the mobile station.

Thereby, manner is provided by which to facilitate home-network access by a roaming wireless device by way of WLANs that are both 802.1x capable and wireless local area networks that are non-802.1x-capable.

Presently preferred embodiments of the disclosure have been described with a degree of particularity. The description is of preferred examples for implementing the disclosure, and the description of the preferred examples is not necessarily intended to limit the scope of the disclosure. The scope of the disclosure is defined by the following claims.

What is claimed is:

1. A method for a wireless device, the method comprising:
   obtaining information indicating whether 802.1x authentication is supported, the information being contained within a broadcast message;
   accessing an indication stored at the wireless device, the indication indicating whether the wireless device is allowed to use a non-802.1x authentication mechanism, the non-802.1x authentication mechanism comprising a tunnel procedure;
   based on the information and the indication stored at the wireless device, identifying, via at least one wireless local area network (WLAN), any available network using at least one of a 802.1x authentication mechanism or the non-802.1x authentication mechanism; and
   indicating at least one network identified using at least one of the 802.1x authentication mechanism or the non-802.1x authentication mechanism.

2. The method of claim 1 wherein the 802.1x authentication mechanism is used when the at least one WLAN supports 802.1x authentication.

3. The method of claim 1 wherein the non-802.1x authentication mechanism is used when the at least one WLAN does not support 802.1x authentication.

4. The method of claim 1 wherein the information further indicates support of non-802.1x authentication.

5. The method of claim 1 wherein the indication comprises OMA DM formatted information.

6. An apparatus comprising:
   processing circuitry configured to:
      obtain information indicating whether 802.1x authentication is supported, the information being contained within a broadcast message;

determine whether to use a non-802.1x authentication mechanism based on an indicator stored at a wireless device, the non-802.1x authentication mechanism comprising a tunnel procedure;

based on the information and the indicator stored at the wireless device, identify, via at least one wireless local area network (WLAN), any available network using at least one of a 802.1x authentication mechanism or the non-802.1x authentication mechanism; and indicate at least one network identified using the 802.1x authentication mechanism or the non-802.1x authentication mechanism.

7. The apparatus of claim 6 wherein the processing circuitry is further configured to use the 802.1x authentication mechanism when the at least one WLAN supports 802.1x authentication.

8. The apparatus of claim 6 wherein the processing circuitry is further configured to use the non-802.1x authentication mechanism when the at least one WLAN does not support 802.1x authentication.

9. The apparatus of claim 6 wherein the indication comprises OMA DM formatted information.

10. A method for a wireless device, the method comprising:

obtaining information indicating whether at least one wireless local area network (WLAN) supports 802.1x authentication, the information being contained within a broadcast message;

determining whether to use a non-802.1x authentication mechanism based on an indicator stored at the wireless device, the non-802.1x authentication mechanism comprising a tunnel procedure;

based on the information and the indicator stored at the wireless device, identifying, via the at least one WLAN, any available network using at least one of a 802.1x authentication mechanism or the non-802.1x authentication mechanism; and indicating at least one network identified using at least one of the 802.1x authentication mechanism or the non-802.1x authentication mechanism.

11. The method of claim 10 wherein the indication comprises OMA DM formatted information.

12. An apparatus comprising:

processing circuitry configured to:

obtain information indicating whether at least one wireless local area network (WLAN) supports 802.1x authentication, the information being contained within a broadcast message;

determine whether to use a non-802.1x authentication mechanism based on an indicator stored at a wireless device, the non-802.1x authentication mechanism comprising a tunnel procedure;

based on the information and the indicator stored at the wireless device, identify, via the at least one WLAN, any available network using at least one of a 802.1x authentication mechanism or the non-802.1x authentication mechanism; and indicate at least one network identified using the 802.1x authentication mechanism or the non-802.1x authentication mechanism.

13. The apparatus of claim 12 wherein the indication comprises OMA DM formatted information.

* * * * *